April 15, 1947.                R. JONES                2,418,943
REGISTER PIN MECHANISM
Filed Dec. 8, 1944                2 Sheets-Sheet 2
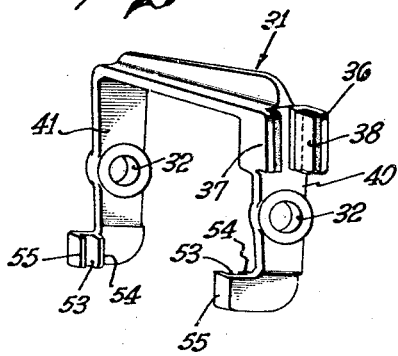
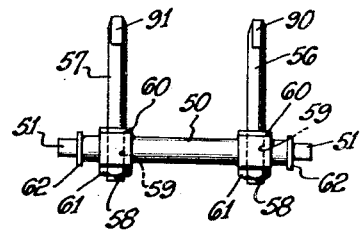
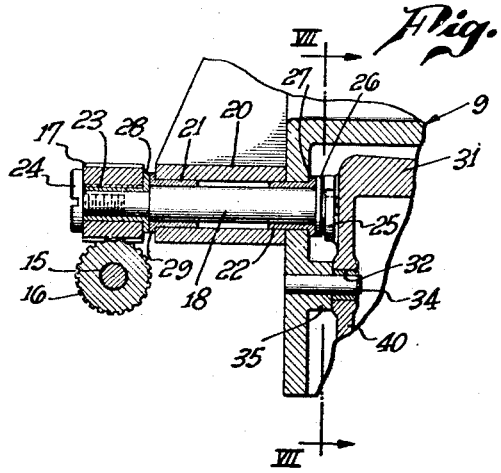
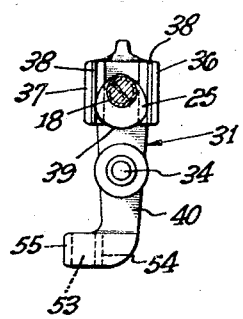
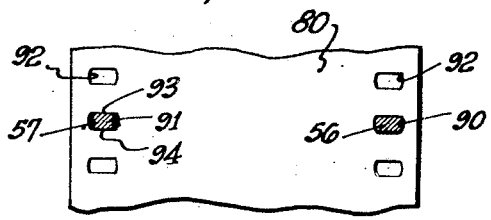
RICHARD JONES,
INVENTOR.
BY
ATTORNEY.

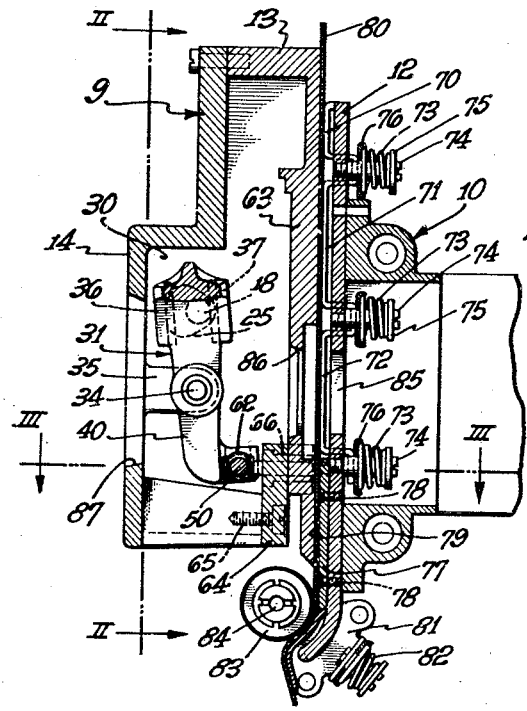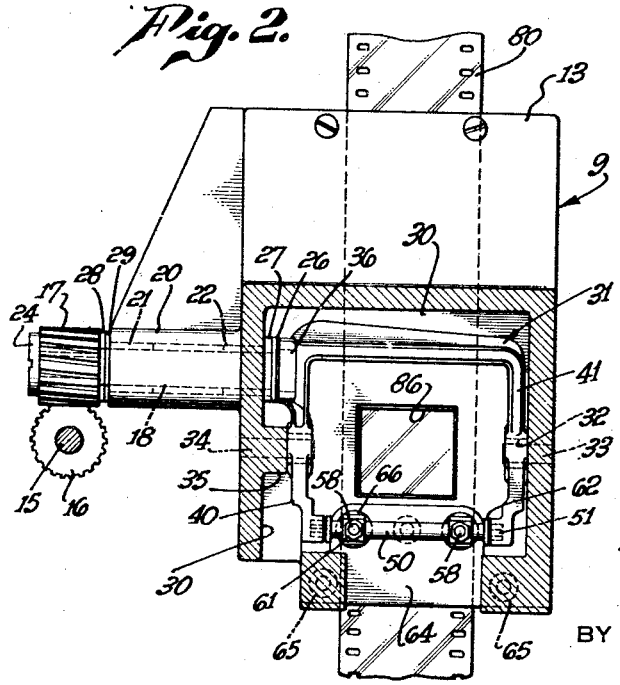

Patented Apr. 15, 1947

2,418,943

UNITED STATES PATENT OFFICE 2,418,943

REGISTER PIN MECHANISM

Richard Jones, Burbank, Calif., assignor to Walt Disney Productions, Burbank, Calif., a corporation of California Application December 8, 1944, Serial No. 567,279

14 Claims. (Cl. 88—18.4)

1

My invention relates to motion picture machines and is a type of device which may find use on either motion picture projectors or motion picture printing machines.

The particular device in question has to do with a mechanism for positioning the film precisely in the machine for the short space of time during which a frame of the motion picture film is being held opposite the projection opening so that while the frame is in still position there will be no displacement or vibration of the film of any appreciable kind. The purpose of holding the film firmly in perfect register may be either for reducing to a minimum the shaking or dancing of a projected image on a large screen a great distance away from the projector or to similarly eliminate all possible vibration of the film while a reproduction is being made from the film as a master film upon a second film.

It is therefore among the objects of my invention to provide a new and improved register pin mechanism which is efficient and precise in its operation, which produces relatively no vibration and noise and which is sufficiently simple in its construction that it can be built into commercial projection equipment which is already on the market or even which may actually be in service.

Another object of my invention is to provide a new and improved positioning mechanism which is timed to operate with the intermittent step by step advance of a film but which is so timed that it will in no way interfere with the regular progress of a motion picture film through the mechanism.

Still another object of my invention is to provide a new and improved register pin mechanism wherein reciprocating parts are joined together in such a manner that the initiating movement, although rotary in character, is translated into a straight-line reciprocating movement without it being necessary to incorporate an elaborate mechanism to accomplish this result.

A further object of my invention is to provide a register pin mechanism wherein the ends of the register pins are designed to be inserted into the same perforations at the side of the film which are used in advancing the film through some machine such as a motion picture projector, the portions of the register pins being tapered and made of such a size with relation to the size of the perforations that they may be gradually driven into the perforations in order to draw the film into a precise, stationary position wherein it will be temporarily held motionless and in

2 perfect register but can be released by withdrawal of the register pins without in any way disturbing the film in its regular progress through the machine.

A further object still is to provide a register pin mechanism which incorporates a pressure gate adjacent thereto so constructed and mounted with relation to the register pins that the film may be advanced or reversed, during which movement the register pins will continue to function accurately and precisely without further adjustment having to be made to the mechanism to shift from a forward to a reverse movement of the film or vice versa.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Fig. 1 is a vertical, sectional view taken approximately through the mid portion of the mechanism comprising my invention.

Fig. 2 is a side view, partially in section, taken on the line II—II of Fig. 1.

Fig. 3 is a cross section taken on the line III—III of Fig. 1.

Fig. 4 is a perspective view of a yoke element utilized in the device.

Fig. 5 is a plan view of a register pin assembly which cooperates with the yoke mechanism.

Fig. 6 is a fragmentary, sectional view of the power takeoff for the yoke.

Fig. 7 is a vertical, sectional view taken on the line VII—VII of Fig. 6.

Fig. 8 is a fragmentary view of a motion picture film taken on the line VIII—VIII of Fig. 3.

As the motion picture projection art continues to develop, more and more accuracy and precision of adjustment is being required of the machinery. While it may be generally understood that motion picture film when running through a projector may be stationarily positioned with reasonable accuracy, as it advances step by step at the rate of twelve feet per minute, there are occasions under special circumstances where the film is not positioned with sufficient accuracy to satisfy every requirement.

One example has been the use of motion pictures in the so-called out-of-door, drive-in theaters. In these theaters the screen is made a great deal larger than the screen used in the average motion picture house because of the fact that it needs to be seen at relatively great distances. It is not possible to compact automobiles into a space as small as even the larger motion picture theaters and it is to the automobile trade that these large drive-in theaters cater.

When the conventional motion picture film is to be projected so as to throw a very large image on the screen it is necessary to place the projector a much greater distance away from the screen than is usually the case. Because of this great distance from the screen a slight vibration or fluttering of the projected image due to the film vibrating a slight amount is magnified so many times that the unsteadiness of the projected image becomes annoying to the audience. To avoid this some additional steadying mechanism needs to be built into the regular projecting apparatus.

In another field of operation, namely in the making of commercial films from a master film, the master film must be held precisely positioned and as still as possible while exposure is being made. There are times when the exposure needs to be relatively long and the longer the exposure time the greater care must be exercised in holding the film still during all of the time that the exposure is being made. Unless this is done the image recorded on the secondary film will not be clear cut, especially after it is projected from the commercial 35 mm. size on to the large screen such as is used in motion picture houses.

When a mechanism is employed to precisely position the film during either projection or printing it also becomes necessary to incorporate it into an apparatus which vibrates as little as possible. Vibration of the device, unless carefully controlled, will cause sufficient disturbance in the projected image to undo the advantage gained by the incorporation of the register pin mechanism comprising the subject matter of this invention.

My invention is incorporated into a relatively compact device having reciprocating parts taking their power from the drive shaft of a camera or projector and which are so compactly designed that the entire unit can be inserted into a machine opposite the film gate without it being necessary to make large and cumbersome additions in the size of the casing or housing.

Briefly stated, power is taken from the drive shaft of the projector or camera. It is transferred by means of cam action to a reciprocating, centrally pivoted yoke which has at the end opposite from the cam drive a pair of register pins designed and mounted to reciprocate in a straight-line direction and having their ends suitably tapered and sized so that they can be projected into the perforations of a normal 35 mm. motion picture film.

In the drawings there is shown a projection head 10 on the front of which is mounted a gate plate 12, while in front of the gate plate is a housing 9 consisting of a base 13 adjacent the gate plate and a cover 14 designed to house virtually all the operating parts of the device. A shutter housing is illustrated in the drawings by a conventional shutter housing positioned in the customary manner and lies immediately adjacent the lefthand end of the portions of the device shown in Fig. 1. As the parts are here illustrated, light from a projection machine would come from the left passing through the device toward the right.

A drive shaft 15, best seen in Fig. 2, provides power to operate the mechanism. This connects by means of a worm gear 16 and pinion 17 to a cam shaft 18 which is journaled within a sleeve 20 at one side of the housing 9. As shown there is a bearing 21 at one end of the sleeve and a second bearing 22 at the other end. At the left hand end of the cam shaft the pinion 17 is keyed to a sleeve 23 which in turn is non-rotatably positioned upon the end of the cam shaft, the pinion being held in place by a machine screw 24.

At the right hand end of the cam shaft as viewed in Figs. 2 and 6, there is provided a cam 25 separated by a short neck from the adjacent end of the cam shaft. A flange 26 at the same end of the cam shaft is designed to bear against a flanged end 27 of the bearing 22. It should also be noted that at the other end of the cam shaft the sleeve 23 has a flange 28 which bears against a similarly flanged end 29 of the bearing 21. By means of this pair of flanges in each case the cam shaft is provided with a relatively snug, rotary fit but is prevented from having any loose play endwise. Such endwise movement as it may have is taken up by the flanges, which really act, in a sense, like thrust bearings.

A rocker arm mechanism carries the rotation of the cam shaft to the dowel pins. This rocker arm mechanism is relatively simple and is housed within a large chamber 30 in the housing 9. The principal element of the rocker arm mechanism consists of a relatively U-shaped yoke 31, a detail of which is shown in Fig. 4. The yoke has apertures 32 one in each leg in axial alignment and these apertures provide a bearing by means of which the yoke is pivoted in the housing. For mounting the yoke stub shafts 33 and 34 are mounted in the sides of the housing and extend through the apertures 32 providing a pivotal mounting for the yoke at substantially its mid portion. For convenience in construction the housing is provided with a boss 35 at one side of the yoke through which the stub shaft 34 extends. The boss is instrumental in holding the adjacent side of the yoke a short distance away from the inside wall of the chamber at this point.

In order to drive the yoke through a reciprocating or oscillating movement there is provided a pair of flanges 36 and 37 positioned parallel to each other defining a cam way. These flanges are shown in detail in Fig. 4 and may be located at the left side of the yoke as viewed in Fig. 2. In order to promote quiet operation the flanges are faced on the inside with a plastic shoe 38, or shoe made of some other non-metallic material.

As best viewed in Figs. 1 and 7, the cam 25 is shown positioned within the cam slot defined by the flanges 36 and 37. The cam slot is slightly greater in width than the maximum width of the cam but is only made greater by a very small clearance so that the operation will be smooth and relatively vibrationless. The shape of the cam is made eccentric and follows such a contour that there will be a short dwell in the position of the yoke at its maximum displacement in each direction. As the cam rotates it will move first against one flange, as for example flange 36, rotating the yoke in one direction and then against the other flange 37 rotating the yoke in the other direction. A short, relatively circular circumference 39 on the cam face is instrumental in producing the dwell above referred to.

At the ends of side elements 40 and 41 of the yoke there is mounted a dowel pin assembly shown in substantial detail in Fig. 3. A dowel pin tie bar 50 has reduced ends 51 journaled in sliding shoes 52 and these shoes in turn are slidably mounted in slots 53 defined by flanges 54 and 55 at the ends of the legs or side elements of the yoke. By slidably mounting the shoes 52 in the slots 53 the shoes may reciprocate back and forth a slight amount.

Mounted upon the tie bar are a pair of registry pins herein designated as dowel pins 56 and 57. For details of the dowel pin assembly reference is made particularly to Fig. 5. As there shown the dowel pins 56 have threaded ends 58 extending through appropriately positioned holes 59 in the tie bar, the pins being provided with flanges 60 at one side and nuts 61 on the other side for holding the dowel pins in fixed position relative to the tie bar. The tie bar in turn is provided with flanges 62 which aid in positioning them together with the shoes 52 between the ends of the side elements of the yoke.

As the yoke is given a reciprocating or oscillating movement by reason of the rotation of the cam 39, the end of the yoke carrying the tie bar is likewise reciprocated. In view of the fact that the motion of the lower end of the yoke is through an arc it is necessary to permit the tie bar to slide up and down in the slot so that a straight-line motion can be maintained and so that the dowel pin will not also move through an arc for reasons which will now appear.

At the right side 63 of the housing as viewed in Figs. 1 and 3, there is provided a base plate 64 secured to the housing by means of machine screws 65. Within the base plate are a pair of bushings 66 customarily made of some metal softer than the metal comprising the dowel pins. Apertures 67 in the bushings provide a smooth, sliding fit for the dowel pins therein. As will be noted especially in Fig. 1, the direction of the axes of the apertures 67 is horizontal and both are in the same horizontal plane. This means that as the dowel pins reciprocate within the bushings they must do so continuously in the same plane and therefore cannot follow the arcuate movement of the adjacent end of the yoke. For this reason the shoes 52 are permitted the sliding movement within the slots 53 previously referred to.

In the gate plate are provided a series of pressure shoes 70, 71 and 72. The pressure shoes have ends extending through the gate plate so that they are in a position to be pressed against the film by means of springs 73 which are mounted upon posts 74 between washers 75 and 76. The washers 76 are designed to bear against the ends of the pressure shoes. At the lower end of the gate plate as viewed in Fig. 1 there is positioned a plate 77 which is permanently attached to the gate plate by means of machine screws 78. The plate 77 has a face 79 normally positioned in a plane slightly displaced from the plane of the faces of the pressure shoes when they are spring-pressed to their maximum extended position.

When a motion picture film 80 is threaded through the apparatus it displaces the pressure shoes a slight amount toward the left as viewed in Fig. 1 against the spring pressure and in this new position the faces of the pressure shoes lie in a plane more nearly adjacent the plane of the face 79 of the plate 77. At the lower end of the gate plate is mounted a curved, spring-pressed shoe 81 backed by a spring mounting 82 of a conventional construction, mechanical details of which have been omitted for the sake of clarity. An intermittent sprocket 83 is rotatably mounted upon a shaft 84 and is designed to bear against the film at the lower end of the structure shown in Fig. 1.

In order that light might pass from the projection head through the apparatus and the film which is passed therethrough, the projection head is provided with an aperture 85. On the other side of the film the wall 63 of the housing 9 is provided with a corresponding aperture 86. Still another aperture 87 is provided in the cover 14. As apparent particularly in Fig. 2, the apertures are centrally located with relation to the space within the base and side elements of the yoke. Constructed in this way the yoke entirely clears the path of light which is passed through the apparatus in order to project the picture of the film upon a screen or some other medium. In this connection it should also be noted that the axis of the stub shafts 33 and 34, which provide the pivotal mounting for the yoke, passes through the center of the film apertures and it should further be noted that a vertical line through the center of the apertures passes midway between the centers of the dowel or registry pins.

For proper operation the dowel pins respectively are provided with tapered ends 90 and 91 in order that the ends when driven may enter smoothly into the perforations 92 at the sides of the film. Lateral registration is accomplished from one side of the film only, namely the pin 56. Both pins may assist in vertical registration inasmuch as they do not work against each other in that direction, should the location of the perforation be displaced from normal. It is also significant to note that at the base of the taper 90 the dowel pin 56 has a cross-sectional area which is exactly the same shape as the perforation 92 with no more clearance than is absolutely necessary in order to prevent stretching the film with the dowel pin as it is driven into the perforation to its most inwardly extending position. The tapered end 91 of the dowel pin 57 has upper and lower flat faces 93 and 94 respectively spaced apart a distance substantially equal to the distance between opposite flat sides of each perforation in the film. The opposite sides of the dowel pin, although curved in general to the same curvature as the curved sides of the perforations in the film, nevertheless are slightly narrower than the full width of the film perforation, as is apparent from the showing in Fig. 8. By providing the dowel pins with a size and shape as just described it has been found that they can be most smoothly inserted into the film perforations and most smoothly withdrawn therefrom, thereby promoting efficient and smooth working operation each time registration is accomplished.

In general, the operation of the device involves passing a motion picture film through the mechanism in the direction shown particularly in Fig. 1. Normally the film will pass from top to bottom. In a conventional projection machine the film will be advanced step by step so that successive frames will appear in the film aperture, will be held there a short space of time and then be advanced.

The yoke is driven through a worm gear and pinion connection herein described directly from the shaft which operates the projection mechanism. By reason of this the reciprocation of the yoke is timed to operate in synchrony with the advance of the motion picture film. The face of the cam 25 is made such that immediately a film is stopped so that a frame of pictures appears before the apertures, the dowel pins are advanced, moving from left to right as viewed in Fig. 1, as the lower part of the yoke is moved from left to right through an arcuate path. The dowel pins, however, move only on a straight line and are gradually inserted into the perforations in the film until they fill the perforations in a manner evidenced by the showing in Fig. 8. The dowel pins remain in the perforations for an instant while the film is held in this position. Then before the film is moved so that the next frame will be brought into position, the dowel pins are withdrawn, thereby permitting free movement of the film. While the dowel pins are in position they hold the film snugly in its proper place so that relatively no vibration or fluttering due to vibration of the apparatus will be apparent in the projected image. Further, by reason of the provision of plate 77 at the lower end of the gate plate immediately adjacent the intermittent sprocket 83 the direction of film may be reversed at any time and for any distance without it being necessary to readjust any parts of the device.

There has therefore been provided a register pin mechanism timed to operate with the advance of a motion picture film in which the number of moving parts has been held to a relative minimum and so positioned one with respect to the other that smooth and efficient operation will be maintained under all conditions.

I claim:

1. A register pin mechanism for a motion picture film projector comprising a casing, a block forming part of a film guide at one side of the casing, a light aperture in the block, a rocker yoke having a position within the casing framing the light aperture and having sides thereof pivotally mounted upon the walls of the casing, a tie bar having the ends thereof rotatably and slidably engaging the ends of the rocker yoke at one side of the pivotal mounting, dowel pins secured to and extending laterally from the tie bar and respectively located opposite the perforations in the film, passages in the block at one side of the casing adapted to slidably receive the dowel pins, said dowel pins having ends corresponding in size to the perforations in the film, and a slot at the end of the rocker yoke remote from the tie bar, a cam in the slot adapted to cooperatively engage opposite sides of the slot and timed to cooperate with the projector shutter and a shaft connecting the cam with the power drive for the projector.

2. A register pin mechanism for a motion picture film projector comprising a casing, a block forming part of a film guide at one side of the casing, a light aperture in the block, a substantially U-shaped rocker yoke having a position within the casing framing the light aperture and having the legs thereof pivotally mounted upon the walls of the casing, a tie bar having the ends thereof journaled in bearing members and said bearing members slidably engaging the ends of the rocker yoke at one side of the pivotal mounting, a pair of dowel pins secured to and extending laterally from the tie bar and spaced a distance apart equal to the distance between the perforations on opposite sides of the film, bushings in the block at one side of the casing adapted to slidably receive the dowel pins, said dowel pins having tapered ends corresponding in size to the perforations in the film, and a slot at the end of the rocker yoke remote from the tie bar, a cam in the slot adapted to alternately engage opposite sides of the slot and timed to cooperate with the projector shutter and a shaft connecting the cam with the power drive for the projector.

3. A register pin mechanism for a motion picture film projector comprising a casing located at the light aperture of the projection housing, one side of the casing comprising a block forming part of a film guide at one side of the casing, a light aperture in the block, a substantially U-shaped rocker yoke having a position within the casing framing the light aperture and having the mid portions of the legs thereof pivotally mounted upon the walls of the casing, a tie bar having the ends thereof journaled in bearing members and said bearing members slidably engaging the ends of the rocker yoke at one side of the pivotal mounting and completing the framing of the light aperture, a pair of dowel pins secured to and extending laterally from the tie bar and spaced a distance apart equal to the distance between the perforations on opposite sides of the film, bushings in the block at one side of the casing having bores therein adapted to slidably receive the dowel pins, said dowel pins having tapered ends corresponding in size to the perforations in the film, and a slot forming a cam way at the end of the rocker yoke remote from the tie bar having the walls thereof fitted with a non-metallic facing, a rotatable cam in the slot adapted to alternately engage opposite sides thereof and timed to cooperate with the projector shutter and a shaft connecting the cam with the power drive for the projector.

4. A register pin mechanism for a motion picture film projector comprising a housing including a guide for the film at one side thereof, said housing having an aperture to permit the passage of light from the film, a reciprocating rocker mechanism connected to the power drive for the projector, a pair of bushings fitted into the housing wall adjacent the film having non-circular bores therein spaced from one another a distance equal to the distance between perforations at opposite sides of the film, a correspondingly shaped, non-circular register pin in each bushing reciprocally slidable therein having one end adapted to extend from one side thereof through the perforations in the film, one of said pins having a tapered end and a shape and size at the base of the taper adapted to fill the film perforations, the other of said pins having a tapered end and a size at the base of the taper adapted to snugly fill the film perforation between upper and lower flat sides thereof and adapted to provide a clearance between the rounded sides of the perforations, and a tie bar having a combined pivotal and transversely reciprocal mounting in the rocker mechanism, the end of each pin remote from the film having a removable attachment to the tie bar and extending laterally thereinto, said pins having a movement timed through said reciprocating rocker mechanism adapted to engage and hold the film by penetration into the perforations while said film is temporarily at rest before the aperture means.

5. A register pin mechanism for a motion picture machine comprising a housing including a portion of a guide for the film at one side thereof, said housing having a light aperture therein, a power driven reciprocating rocker mechanism comprising a yoke having sides and a base, a pivotal mounting at the sides of the yoke, a cam way on one side adjacent the base and a rotating eccentric cam in the cam way adapted to impart reciprocal movement to the yoke, guide slot means in the yoke at the side remote from the cam way and a pin assembly having a reciprocating location in the housing and adapted to execute a reciprocal movement in said location, said pin mechanism having ends located in the guide slot means.

6. A register pin mechanism for a motion picture machine comprising a housing including a portion of a guide for the film at one side thereof, said housing having an aperture to permit the passage of light from the film, a reciprocating rocker mechanism connected to the power drive for the projector comprising a yoke having sides and a base, a pivotal mounting at the sides of the yoke, a cam slot on one side adjacent the base and a rotating eccentric cam in the slot adapted to engage the yoke in the slot and impart reciprocal movement thereto, guide slot means on the side of the yoke remote from the cam slot, and a pin assembly having an endwise, reciprocal location in the housing, said pin mechanism having ends shiftably mounted in the guide slot means and adapted to move therein when subjected to reciprocation by said yoke.

7. A register pin mechanism for a motion picture film projector comprising a housing including a portion of a guide for the film at one side thereof, said housing having an aperture to permit the passage of light from the film, a reciprocating rocker mechanism connected to the power drive for the projector comprising a yoke having sides and a base, a pivotal mounting at the sides of the yoke, a longitudinal cam slot on one side adjacent the base and a rotating eccentric cam in the slot adapted to alternately engage opposite sides of the slot and impart reciprocal movement to the yoke, a pair of guide slots at the end of the yoke remote from the cam slot extending in the same general direction as said cam slot, and a pin assembly having a reciprocating location in the housing, said pin mechanism including ends each having a pivotal and transversely shiftable mounting in the guide slots adapted to move laterally relative to the guide slots when subjected to reciprocation by said yoke.

8. A register pin mechanism for a motion picture film projector comprising a housing including a portion of a guide for the film at one side thereof, said housing having an aperture to permit the passage of light from the film, a reciprocating rocker mechanism connected to the power drive for the projector comprising a substantially U-shaped yoke, a pivotal mounting at the sides of the yoke, a longitudinal cam slot on one of said sides adjacent the base of the yoke and a rotating eccentric cam in the slot adapted to alternately engage opposite sides of the slot and impart reciprocal movement to the adjacent end of the yoke, laterally extending projections on the sides of the yoke remote from the base, a guide slot at the end of each projection extending in the same general direction as the cam slot, and a pin assembly having a fixed reciprocating position in the housing, said pin mechanism including ends each having a pivotal and transversely shiftable journal box mounted in the guide slots and adapted to move endwise relatively to the guide slots when subjected to reciprocation by said yoke.

9. In a register pin mechanism for a motion picture machine a reciprocating yoke, a dowel pin assembly on one side of the yoke having a reciprocating movement and a dowel pin forming part thereof, a supporting member forming one side of a film guide, a projection aperture in the supporting member and a bore therein adapted to reciprocally position the dowel pin at a location cooperable with perforations on a motion picture film, a pressure gate member forming another part of said guide comprising a base element, pressure shoes resiliently mounted on the base respectively adjacent each side edge of the film and adapted to press the film in slidable contact with the side of the supporting member, a stationary plate on the base in the path of the film and located at the side of the aperture toward which the film normally travels, said stationary plate having a hole therein in alignment with and adapted to receive the register pin in projected position and having its film contacting surface spaced from the supporting member a distance not less than the thickness of the motion picture film.

10. In a register pin mechanism for a motion picture machine a reciprocating yoke, a dowel pin assembly on one side of the yoke having a reciprocating movement and dowel pins forming part thereof, a supporting member forming one side of a film guide, a projection aperture in said supporting member and a bore therein adjacent an edge of the aperture and adapted to reciprocally position the dowel pins at locations cooperable with perforations on a motion picture film, a pressure gate member forming another part of said guide comprising a base element, pressure shoes resiliently mounted on the base respectively adjacent each side edge of the film and adapted to press the film in slidable contact with the supporting member, a relatively flat, stationary plate on the base in the path of the film and located at the side of the aperture toward which the film normally travels, said stationary plate having a recess means in alignment with and adapted to receive the register pins when in projected position and having its film contacting surface spaced from the supporting member a distance not less than the thickness of the motion picture film, and an intermittent sprocket adapted to hold the film against the pressure gate member.

11. In a register pin mechanism for a motion picture machine a reciprocating yoke, a dowel pin assembly on one side of the yoke having a reciprocating movement and a pair of dowel pins forming part thereof, a register pin housing therefor having one side of the housing forming one side of a film guide, a projection aperture in said side and a bore therein adjacent each edge of the aperture at one side thereof adapted to reciprocally position the dowel pins at locations cooperable with perforations on a motion picture film, a pressure gate member forming another part of said guide comprising a flat base element adapted to be secured to a projection housing, a plurality of pressure shoes resiliently mounted on the base respectively adjacent each side edge of the film and at the sides of the aperture and adapted to press the film in slidable contact with the side of the register pin housing, a relatively flat, stationary plate on the flat base in the path of the film and located at the side of the aperture toward which the film normally travels, said stationary plate having a pair of holes therein in alignment with and adapted to receive the register pins when in projected position and having a film contacting surface substantially in the plane of the contacting portions of the shoes when in depressed position, and an intermittent sprocket adapted to hold the film against the pressure gate member.

12. In a register pin mechanism for a motion picture machine a reciprocating yoke, a dowel pin assembly on one side of the yoke having a reciprocating movement and a pair of dowel pins forming part thereof, a register pin housing therefor having one side of the housing forming one side of a film guide, a projection aperture in said side and a bore therein adjacent each edge of the aperture at one side thereof adapted to reciprocally position the dowel pins at locations cooperable with perforations on a motion picture film, a pressure gate member forming another part of said guide comprising a flat base element adapted to be secured to a projection housing, a plurality of pressure shoes resiliently mounted on the base respectively adjacent each side edge of the film and at the sides of said aperture and adapted to press the film in slidable contact with the side of the register pin housing, a flat, stationary plate on the flat base in the path of the film and located at the side of the aperture toward which the film normally travels, said stationary plate having a pair of holes therein in alignment with and adapted to receive the register pins when in projected position and having a film contacting surface substantially in the plane of the contacting portions of the shoes when in depressed position, a curved pressure shoe in the path of the film directed toward the register pin housing and an intermittent sprocket adapted to hold the film against the curved pressure shoe and said stationary plate.

13. A register pin mechanism for motion picture apparatus including a film gate, comprising: a U-shaped yoke having arms and a base; means carried by the sides of the arms intermediate their ends for pivotally mounting the yoke adjacent the film gate; a cam slot in the side of one arm near one end thereof; a rotatable eccentric cam cooperatively engaging the walls of the cam slot to impart oscillation to the yoke; a guide slot in the other end of each arm of the yoke; each guide slot including guide walls in planes parallel to arms of the yoke; and a pin assembly including pins having a reciprocating location adjacent the film gate and end portions having a pivotal and shiftable location in the guide slots.

14. A register pin mechanism for motion picture apparatus including a film gate, comprising: a U-shaped yoke having arms and a base; means carried by the sides of the arms intermediate their ends for pivotally mounting the yoke adjacent the film gate; a cam slot in the side of one arm near one end thereof; a rotatable eccentric cam cooperatively engaging the walls of the cam slot to impart oscillation to the yoke; a guide slot in the other end of each arm of the yoke, each guide slot including guide walls in planes parallel to arms of the yoke; a shoe slidably mounted in each of the guide slots; and a registry pin assembly including a tie bar having cylindrical end portions, the end portions of the tie bar being journaled in the shoes, and a pair of registry pins extending from the tie bar transversely thereto.

RICHARD JONES.

REFERENCES CITED

The following references are of record in the file of this patent:

UNITED STATES PATENTS

| Number | Name | Date |
|---|---|---|
| 1,350,023 | Kelley et al. | Aug. 17, 1920 |
| 1,716,989 | Troland | June 11, 1929 |
| 1,927,887 | Crespinel | Sept. 26, 1933 |
| 2,049,041 | Berggren | July 28, 1936 |
| 2,259,849 | Worrall | Oct. 21, 1941 |